United States Patent

[11] 3,582,019

| [72] | Inventor | Vincent L. Pisacane<br>Laurel, Md. |
|---|---|---|
| [21] | Appl. No. | 809,561 |
| [22] | Filed | Mar. 24, 1969 |
| [45] | Patented | June 1, 1971 |
| [73] | Assignee | The United States of America as represented by the Secretary of the Navy |

[54] ROTOR FOR SATELLITE STABILIZATION
4 Claims, 7 Drawing Figs.
[52] U.S. Cl. ..................................................... 244/1
[51] Int. Cl. ....................................................... B64g 1/00
[50] Field of Search .......................................... 244/1 SS

[56] References Cited
UNITED STATES PATENTS
3,048,108  8/1962  Roberson et al. ............. 244/1(SS)X
3,511,452  5/1970  Smith et al. .................... 244/1(SS)

Primary Examiner—Milton Buchler
Assistant Examiner—Jeffrey L. Forman
Attorneys—R. S. Sciascia and J. A. Cooke ABSTRACT: The subject invention relates to a rotor for three-axis stabilization of a passively damped gravity-gradient spacecraft, and more particularly to a rotor for yaw stabilization, yaw-roll decoupling, and libration damping, when used in combination with an energy dissipator, for example, a ball-in-ball damper. The angular momentum vector of the rotor is oriented along the preferred pitch axis of the spacecraft. The motor is utilized to spin the rotor and produce a yaw-controlling reaction torque of the spacecraft and, thereby, to overcome disturbing torques occasioned by thermal bending forces in gravity-gradient stabilizing booms, radiation pressure, residual magnetization and aerodynamic forces.

PATENTED JUN 1 1971

INVENTOR
VINCENT L. PISACANE

BY

ATTORNEY

INVENTOR
VINCENT L. PISACANE

INVENTOR
VINCENT L. PISACANE

MAXIMUM LIBRATION AMPLITUDES

| ANGLE | BOUNDS ON AMPLITUDE (DEG.) |
|---|---|
| PITCH | −0.40 TO 1.3 |
| ROLL | −1.1 TO 0.4 |
| YAW | −0.63 TO 0.66 |
| TOTAL DEV. | 1.7 |

FREQUENCY TABLE:

| DEVIATION FROM LOCAL VERTICAL (DEG.) | RELATIVE FREQUENCY | CUMULATIVE FREQUENCY |
|---|---|---|
| 0-1 | 0.62 | 0.62 |
| 1-2 | 0.38 | 1.00 |

*FIG. 7*

INVENTOR
VINCENT L. PISACANE

ROTOR FOR SATELLITE STABILIZATION

BACKGROUND OF THE INVENTION

Stabilization of earth satellites has been achieved through a variety of ingenious arrangements ranging from extendible booms to interaction with the earth's geomagnetic field. One such proposal involves the interaction of a permanent magnet dipole within a satellite with the magnetic field of the earth much like the needle of a compass.

For the particular satellite attitude control applications requiring gravity-gradient stabilization, simple and effective means have been fabricated and are presently in use. Particularly, two-axis, as well as three-axis, gravity-gradient stabilization of earth satellites has been previously demonstrated.

Three-axis stabilization is presently achieved by a configuration utilizing an unsymmetrical inertia ellipsoid. In this configuration, however, yaw stability is obtained either at the expense of the pitch restoring torque or at a significant increase in the moments of inertia of the system. This disadvantageous situation is readily illustrated by examining the uncoupled restoring torques of a specific spacecraft configuration consisting of a spherically symmetrical payload of inertia $I_a$ and vertical and horizontal dumbbell structure of inertia $I$ and $\gamma I$ about axes normal to the structure at their respective centers of mass.

Uncoupled restoring torques become $$T_p = 3\omega_o{}^2(I_r - I_y)\alpha_2 = 3aG_o{}^2 I\alpha_2(1-\gamma)$$
$$T_r = 4\omega_o{}^2(I_p - I_y)\alpha_1 = 4aG_o{}^2 I\alpha_1 \quad (1)$$
$$T_y = \omega_o{}^2(I_p - I_r)\alpha_3 = \omega_o I\alpha_3$$

where it is required for stability that
$$I_p > I_r > AI_y \quad (2a)$$
so that
$$0 < \gamma < 1 \quad (2b)$$

As $\gamma$ increases from zero, the increase in yaw restoring torque is accompanied by a decrease in pitch restoring torque. At a $\gamma$ of three-fourths, the yaw and pitch restoring torques become equal, at a value of one-fourth the pitch restoring torque when $\gamma$ equals zero. When $\gamma$ is zero the configuration reduces to a dumbbell configuration.

Increases in the moments of inertia to compensate for this effect cannot be obtained without penalty by merely increasing the lengths of the boom structures. These booms are not rigid bodies; consequently they introduce stabilization errors through lack of straightness, thermal distortion, and radiation pressure, which increase as the lengths of the booms increase.

SUMMARY

The disturbing torques which act on a spacecraft include thermal bending of booms, radiation pressure, and interaction of the residual magnetic dipole with the magnetic field. The present invention proposes the use of a small constant-speed rotor to provide yaw controlling torque of sufficient magnitude to stabilize a dumbbell-shaped spacecraft. The size of the subject rotor allows advantageous location of the satellite stabilization apparatus and reduces the total weight of stabilization control systems now in use. The present rotor can be substituted for either one or two yaw stabilizing booms yet continue to minimize perturbing torques.

Spacecraft libration damping can be concurrently attained by providing an energy dissipator between the rotor system and the spacecraft.

It is therefore an object of the present invention to provide means for rapid and efficient three-axis stabilization of earth satellites.

It is a further object of the invention to reduce the total stabilization system weight by substituting a small, lightweight rotor for either one- or two-yaw stabilizing booms.

A still further object of the invention is to contribute materially to damping satellite libration by providing energy dissipation means between the rotor system and the satellite.

Further objects and advantages will become more apparent on consideration of the following detailed description of the preferred embodiments.

DESCRIPTION OF THE DRAWINGS

FIG. 7 is a table listing the maximum amplitude of the pitch, roll, and yaw angles with a frequency table of the deviation of the vertical axis of the spacecraft from the local vertical.

DESCRIPTION OF THE PREFERRED EMBODIMENTS

Figure 1:
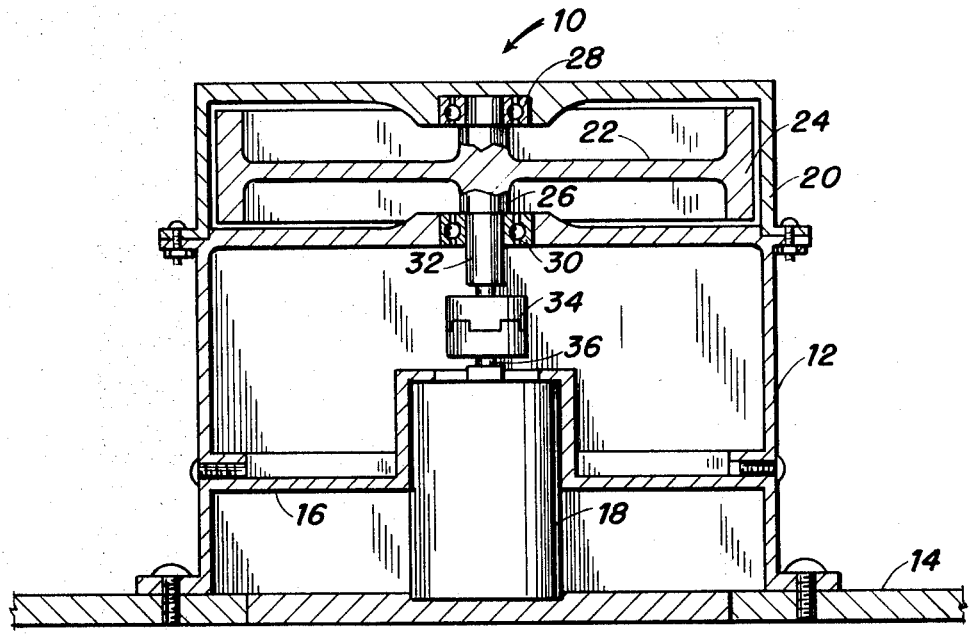
FIG. 1 is a section of the subject rotor assembly mounted on a spacecraft, only a small portion of the service module of the spacecraft being shown.

With reference to FIG. 1, a rotor assembly is shown generally at 10 and includes a housing 12 fixedly attached to a service module 14 of a spacecraft to be stabilized. The housing 12 is provided internally with a generally annular support 16 which supports a constant speed electric motor 18. Mounted on the housing 12 is a circular rotor enclosure 20. Within the rotor enclosure 20 is a rotor 22 having a rim 24, in which is concentrated a large proportion of the rotor's weight, and a central hub 26, rotatably supported by a pair of roller bearings 28 and 30, which are respectively disposed in opposed walls of the rotor enclosure 20 and the motor housing 12. The rotor 22 additionally includes a central drive shaft 32 which protrudes into the housing 12 and is operatively connected by any well-known coupling device, such as mesh gear 34, to the output shaft 36 of the motor 18. Operation of the rotor 22 by the motor 18 thus enables the stabilization of a spacecraft in a manner to be described hereinafter.

Figure 2:
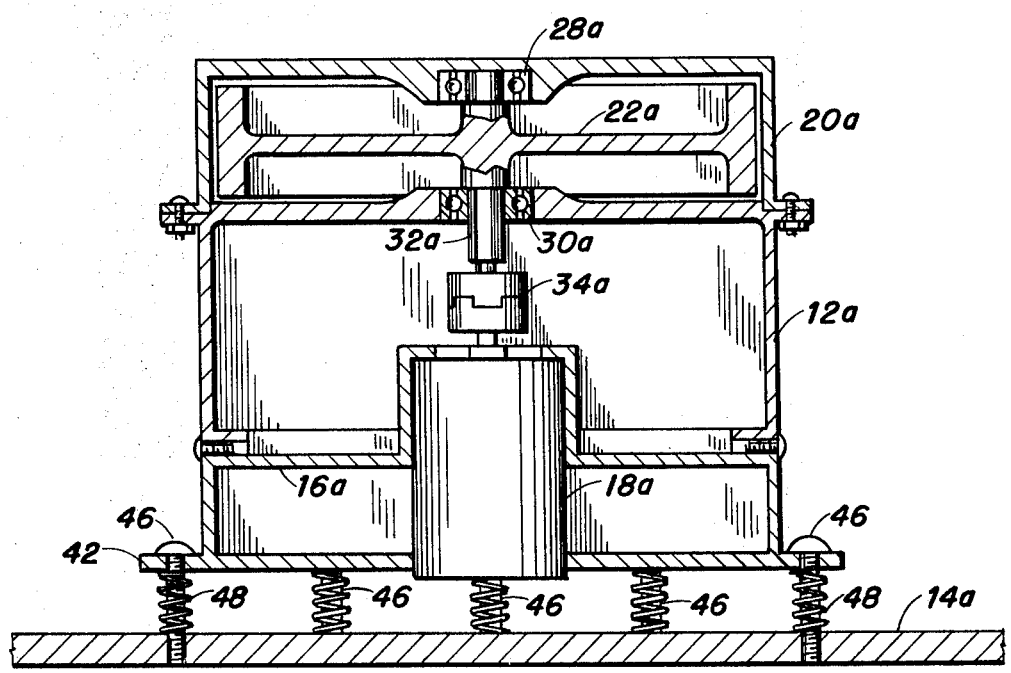
FIG. 2 is a section of a second embodiment of the invention which further provides libration damping.

A second embodiment of the invention is seen in FIG. 2 to include a housing 12a joined to a generally annular support 16a which supports a constant speed electric motor 18a. The support 16a is attached to a service module 14a of a spacecraft by a plurality of spring-loaded bolts 46 which extend through an annular mounting flange 42 on the support 16a. Springs 48 of the spring-loaded bolts 46 are disposed between the flange 42 and the module 14a to allow energy dissipation for libration damping. A rotor 22a and associated driving means are disposed similarly to the disposition of similar structural components described for the embodiment of FIG. 1 hereinabove.

Figure 3:
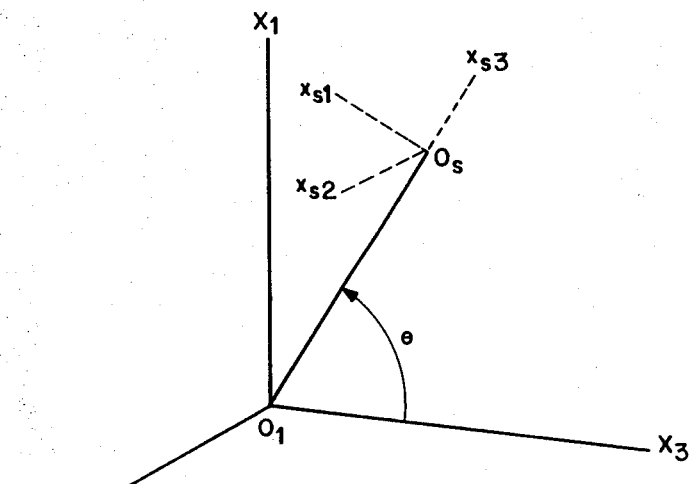
FIG. 3 is a graphic view of the body-fixed reference system used to discuss spacecraft dynamics.
Figure 4:
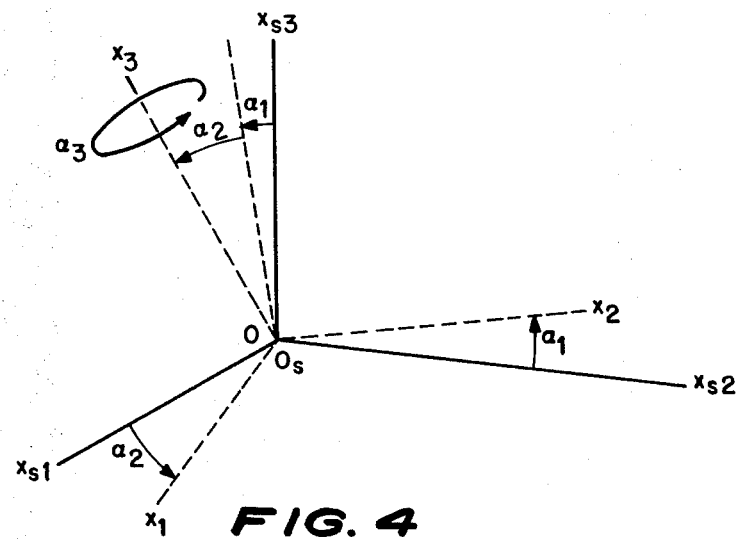
FIG. 4 is a graphic view of the Euler absolute reference system used to further describe spacecraft dynamics.

In order to appreciate the advantages achieved by the present invention, a detailed discussion of spacecraft stabilization dynamics according to the present device is given. The spacecraft is assumed to have a general rigid configuration and a constant speed rotor fixed at its center of mass so that its angular momentum vector is along the $X_2$ axis, as shown in FIGS. 3 and 4, said views picturing the coordinate systems used as frames of reference convenient to a discussion of the spacecraft dynamics. The center of mass of the spacecraft is constrained to move on a circular orbit that is fixed in inertial space. The orientation of the body-fixed reference system $0(x_1, x_2, x_3)$ is related to a local frame of reference $0_s(x_{s1}, x_{s2}, x_{s3})$ of known orientation by a set of ordered Euler angles $\alpha_i (i=1$ to $3)$. Effects on the librational motion on the orbital motion and the higher order terms of the geopotential expansion are neglected.

The equations of motion of the spacecraft without the rotor can be written in the form of Euler's equations of motion as $$I_{s1}\dot{\omega}_{s1} - (I_{s2} - IAs3)\omega_{s2}\omega_{s3} = T_{s1g} + TAQs1r + T_{s1e}$$
$$I_{s2}\dot{\omega}_{s2} - (I_{s3} - I_{s1})\omega_{s3}\omega_{s1} = T_{s2g} + TAQs2r + T_{s2e} \quad (4)$$
$$I_{s3}\dot{\omega}_{s3} - (I_{s1} - IAs2)\omega_{s1}\omega_{s2} = T_{s3g} + TAQs3r + T_{s3e}$$

The equations of motion of the rotor can be derived directly from Newton's second law assuming that the inertia ellipsoid of the rotor is symmetric about its spin axis. The time derivative of the angular momentum is $$(\vec{L})=(\vec{L})_o+\vec{\omega}\times\vec{L} \quad (5)$$

where $$\vec{L}=\vec{I}_r\vec{\omega}_r \quad (6)$$
$$\vec{\omega}_r=\vec{\omega}_s+\vec{r} \quad (7)$$

The $o$ subscript denotes differentiation in $0(x_1, x_2, x_3)$. Then the equations of motion for the rotor become $$\begin{aligned}
I_{r1}\dot{\omega}_{r1}+\omega_{s2}\omega_{r3}I_{r3}-\omega_{s3}\omega_{r2}I_{r2}&=T_{r1g}+T_{r1s}+T_{r1e}\\
I_{r2}\dot{\omega}_{r2}+\omega_{s3}\omega_{r1}I_{r1}-\omega_{s1}\omega_{r3}I_{r3}&=T_{r2g}+T_{r2s}+T_{r2e}\\
I_{r3}\dot{\omega}_{r3}+\omega_{s1}\omega_{r2}I_{r2}-\omega_{s2}\omega_{r1}I_{r1}&=T_{r3g}+T_{r3s}+T_{r3e}
\end{aligned} \quad (8)$$

Since $$T_{ris}=-T_{sir}, i=1 \text{ to } 3 \quad (9)$$

Eqs. (4) and (8) combine to form $$\begin{aligned}
I_1\dot{\omega}_{s1}-(I_2-I)\omega_{s2}\omega_{s3}-\omega A\text{ws}3\Omega I_R A x T_{1\sigma}+_1\\
I_2\dot{\omega}_{s2}-(I_3-I)\omega_{s3}\omega_{s1} &= T_{2g}+T_2\\
I_3\dot{\omega}_{s3}-(I_1-I)\omega_{s1}\omega_{s2}+\omega A\text{ws}1\Omega I_R A x T_{3\sigma}+_3
\end{aligned} \quad (10)$$

where $$\begin{aligned}
I_i &\equiv I_{si}+I_{ri}\\
T_{ig} &\equiv T_{sig}+T_{rig} \quad (11)\\
T_i &\equiv T_{sie}+T_{rie}\\
I_R &\equiv I_{r2}
\end{aligned}$$

The angular velocity of the spacecraft and its derivative are given by $$\begin{aligned}
\omega_{s1}&=\dot{\alpha}_1+_o\alpha_3\\
\omega_{s2}&=\dot{\alpha}_2+_o\\
\omega_{s3}&=\dot{\alpha}_3-_o\alpha_1
\end{aligned} \quad (12)$$

$$\begin{aligned}
\dot{\omega}_{s1}&=\ddot{\alpha}_1+_o\dot{\alpha}_3\\
\dot{\omega}_{s2}&=\ddot{\alpha}_2\\
\dot{\omega}_{s3}&=\ddot{\alpha}_3-_o\dot{\alpha}_1
\end{aligned} \quad (13)$$

for small angular deviations of the spacecraft from its equilibrium orientation. The gravity-gradient torques, for small angles, are given by $$\begin{aligned}
T_{1g}&=3\omega_o a2(I_3-I_2)\alpha_1\\
T_{2g}&=3\omega_o a2(I_3-I_1)\alpha_2 \quad (14)\\
T_{3g}&=0
\end{aligned}$$

Substituting Eqs. (12), (13), and (14) into Eq. (10) with $$\phi\equiv\omega_o t, (\ )'\equiv\frac{d}{d\phi}=\omega_o^{-1}\frac{d}{dt} \quad (15)$$

yields $$I_2\alpha_2''+3(I_1-I_3)\alpha_2=T_2/\omega_o^2$$

$$I_1\alpha_1''+\alpha_3'\left[(I_3-I_2+I_1)-\frac{\Omega}{\omega_o}I_R\right]$$
$$+\alpha_1\left[4(I_2-I_3)+\frac{\Omega}{\omega_o}I_R\right]=T_1/\omega_o^2$$

$$I_3\alpha_3''+\alpha_1'\left[(I_2-I_3-I_1)+\frac{\Omega}{\omega_o}I_R\right]$$
$$+\alpha_3\left[(I_2-I_1)+\frac{\Omega}{\omega_o}I_R\right]=T_3/\omega_o^2$$

$$(16)$$

which is the desired form for the equations of motion of the system. $\alpha_1, \alpha_2, \alpha_3$ are the roll, pitch, and yaw angles respectively.

The equation for the pitch motion is uncoupled from the roll and yaw equations and it is independent of the presence of the rotor. The coupled roll-yaw equations, which of course reduce to the well-known equations for a rigid body when $\Omega$ is zero, have restoring torques dependent on the rotor characteristics. The uncoupled restoring torques are given by $$\begin{aligned}
T_p&=3\omega_o^2(I_1-I_3)\alpha_2\\
T_r&=[4\omega_o^2(I_2-I_3)+\omega_o\Omega I_R]\alpha_1 \quad (17)\\
T_y&=[\omega_o^2(I_2-I_1)+\omega_o\Omega I_R]\alpha_3
\end{aligned}$$

For a spacecraft configuration with $$I_2\geq I_1>AI_3$$

the rotor contributes constructively to the restoring torques if $\Omega$ is positive. For the particular case of a spacecraft with $$I_1=I_2\equiv I>I_3$$

Eq. (16) becomes $$\alpha_2''+3\left(1-\frac{I_3}{I}\right)\alpha_2=\frac{T_2}{I\omega_o}2$$

$$\alpha_1''+\alpha_1\left[4\left(1-\frac{I_3}{I}\right)+\frac{\Omega}{\omega_o}\frac{I_R}{I}\right]+\alpha_3'\left(\frac{I_3}{I}-\frac{\Omega}{\omega_o}\frac{I_R}{I}\right)=\frac{T_1}{I\omega_o}2$$

$$(18)$$

$$\frac{I_3}{I}\alpha_3''+\alpha_3\left(\frac{\Omega}{\omega_o}\frac{I_R}{I}\right)-\alpha_1'\left(\frac{I_3}{I}-\frac{\Omega}{\omega_o}\frac{I_R}{I}\right)=\frac{T_3}{I\omega_o}2$$

The uncoupled restoring torques are then given by $$\begin{aligned}
T_p&=3\omega_o a2(I-I_3)\alpha_2\\
T_r&=[4\omega_o A o^2(I-I_3)+\Omega\omega_o aI_R]\alpha \quad (19)\\
T_y&=\Omega\omega_{oR}\alpha_3
\end{aligned}$$

Equations (17) and (19) can be used to determine spacecraft and rotor characteristics if estimates of the disturbing torques are available. If $\Omega$ is negative, which means that the rotor spin angular momentum vector is antiparallel to the orbital angular momentum vector, the yaw restoring torque is negative, and this orientation will not persist. It follows directly from Eq. (18) that if $$\Omega I_R<4\omega(I-I_3) \quad (20)$$

a necessary condition of stability is that $$\Omega>0. \text{ If } \Omega<0$$

an aperiodic divergence will occur. Thus, preferred yaw orientation can be achieved through utilization of the rotor.

The dynamic characteristics of a single dumbbell satellite with passive damping in a sun-synchronous orbit can be conveniently studied. The study includes the effects of gravity-gradient torques, residual dipoles, solar radiation pressure, thermal distortion of gravity-gradient booms, and passive dampers of the eddy current and hysteretic type. The center of mass of the spacecraft is constrained to an orbit with a longitude of the ascending node and an argument of perigee which are linear functions of time. The study given hereinafter is facilitated by utilization of a high order expansion of the rotating geomagnetic field in terms of spherical harmonics. Integration of the nonlinear second-order differential equations of motion over the time domain is accomplished by a fourth order Runge-Kutta integration.

Important parameters for the study are given in the following table.

Satellite and Orbit Characteristics and Initial Conditions
Satellite Characteristics:
  $I_p=I_r=A2.88\times10^9$ gm.-cm.$^2$ (212.5 slug-ft.$^2$, 7 lb. at 30 ft.)
  $I_y=2.71\times10^8$ gm.-cm.$^2$ (20 slug-ft.$^2$)
  $A=11,280$ cm.$^2$, effective radiation area
  $r=47.7$ cm., effective radiation momentum
  $c=70,000$ dyne-cm.-sec., effective damping coefficient
  $\delta=10.3$ cm., tip deflection from thermal bending
  $P_R=(0,500,0)$ pole-cm., components of residual dipole
  $M=102$ kg. (225 lb.)
  $m_r=222$ g., mass of rotor
  $\bar{r}=8$ cm., radius of gyration of rotor
  $\Omega=377$ rad/sec. (3600 r.p.m.), max rotor speed
Orbit Characteristics:
  $a=1.101628$ earth radii, semimajor axis
  $e=0$, eccentricity
  $i=1.71016$ radians, inclination (98°)
  $\Omega=1.570796$ radians, rt asc. ascn. node
  $\omega=0$ radians, argument of perigee
  $M=0$ radians, mean anomaly
  $\dot{\Omega}=1.992385\times10^{c\alpha 17}$ rad/sec., precession rate of node
  $\dot{\omega}=0.6479276\times10^6$ rad/sec., precession rate of perigee
  $T=80$-$66$-$7200$ day-year-sec., time of perigee
Initial Conditions:
  Transient Run
    $\alpha_1=0°$   $\alpha_1'=0$, roll
    $\alpha_2=5°$   $\alpha_2'=0$, pitch
    $\alpha_3=180°$ $\alpha_3'=0$, yaw
  Steady-State Run
    $\alpha_1=0$   $\alpha_1'=0$, roll
    $\alpha_2=0$   $\alpha_2'=0$, pitch $\alpha_3=0 \quad \alpha_3'=0$, yaw The rotor characteristics were selected to provide an uncoupled yaw restoring torque of 100 dyne-cm./deg. For a rotor speed of 3600 r.p.m., the required rotor inertia of $1.42\times10^4$ gm.-cm.$^2$ (0.49 lb. at 3.15 inches) is computed from Eq. (19). Damping of the librational motion is assumed in this case to be obtained by dissipation of energy through a well-known passive eddy current ball-in-ball damper that is assumed to be locked to the geomagnetic field.

Disturbing torques acting on the spacecraft described above are the thermal deflection of the 30-foot vertical boom, radiation pressure, and interaction of the damper and residual dipole with the magnetic field. A residual dipole of 500 pole-cm. was assumed along the $X_2$ (pitch) axis of the spacecraft.

Figure 5:
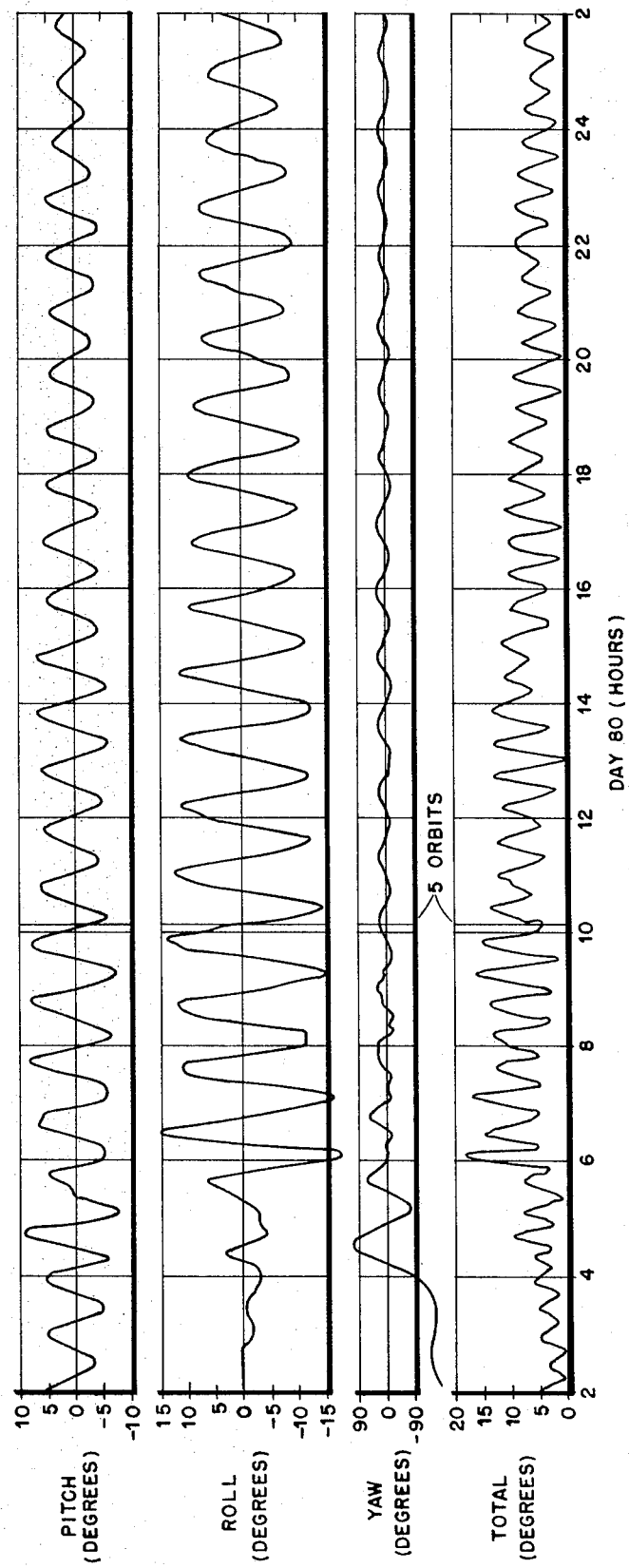
FIG. 5 is a time-motion graph illustrating a transient condition in which rotor angular velocity increases quadratically from zero to full speed over a period encompassing five orbits.

FIG. 5 illustrates graphically the results of a transient condition in which the rotor angular velocity increases quadratically from zero to full speed over a period encompassing five orbits. To demonstrate preferred yaw stability, the initial yaw angle is taken to be the situation where the rotor spin and orbital angular momentum vectors are antiparallel.

Figure 6:
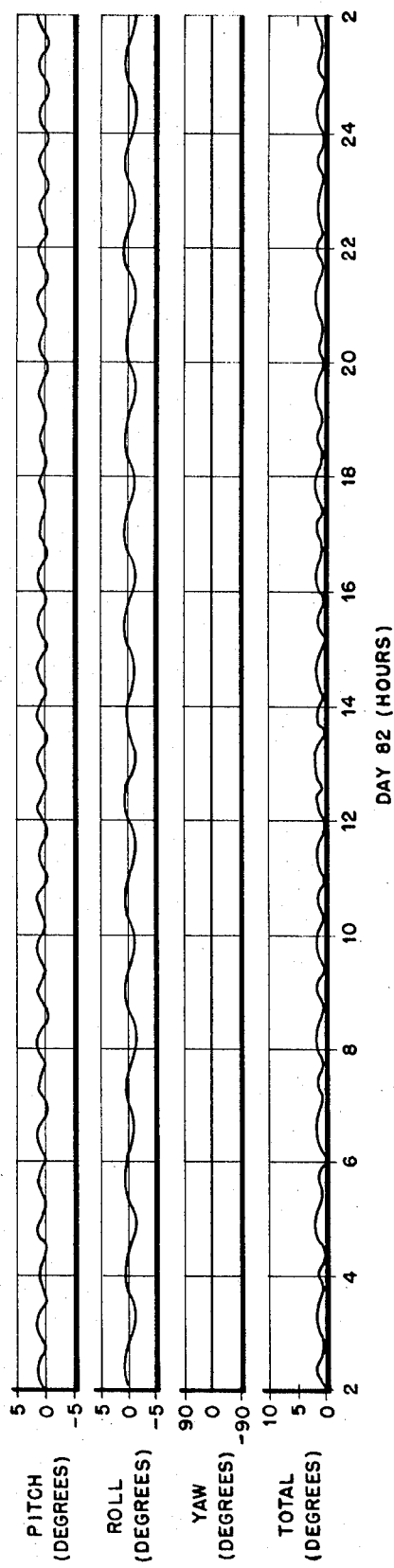
FIG. 6 is a time-motion graph illustrating the effects of disturbing torques on the attitude of a spacecraft initially possessing equilibrium orientation.

In FIG. 6, the time history of the orientation of the spacecraft during the first day of the three days studied for the transient condition is shown. These results graphically indicate that within three orbits the spacecraft achieves preferred yaw capture and that an increase in libration amplitude accompanies the yaw capture. By the end of the day, the amplitude of libration has been significantly damped.

The effects of disturbing torques on the attitude of a spacecraft already possessing equilibrium orientation is illustrated graphically in FIG. 6, while FIG. 7 lists the maximum amplitudes of the pitch, roll, and yaw angles with a frequency table of the deviation of the vertical axis of the spacecraft from the local vertical. FIG. 6 specifically presents the results of the third day of the three days studied for the steady-state condition. As seen from FIGS. 6 and 7, the steady-state pitch libration at twice orbital frequency arises from the perturbing effects of the eddy current damper. Utilization of a damper with a smaller coefficient of damping could more conveniently be used. Roll and yaw libration result primarily from the perturbing effects of the residual dipole and occur at the orbit frequency.

The results as given in FIGS. 5, 6, and 7 verify that a small rotor can be used to obtain yaw stability of dumbbell satellites. Substituting the rotor to replace either one or two yaw stabilizing booms of a spacecraft should reduce the total weight of the stabilization control system and minimize the perturbing torques.

Another promising use of the rotor also follows from the linearized equations of motion, Eg. (18). If $\Omega$ is set equal to zero, coupling between the roll and yaw equations of motion always exists since $$I_2 < I_1 + I_3$$

However the constant speed rotor can be used to decouple, for small angles, the roll and yaw equations if $$\Omega I_R = \omega_0(I_1 + I_3 - IA2)$$

This decoupling could be useful in missions in which controlled angular motions of the spacecraft are a requirement. For example, a torque producing device could be used to induce a high frequency roll motion to increase the effective field of view of a narrow beam antenna or telescope. Decoupling the equations of motion would minimize the power required and allow the roll motion to exist without inducing first-order yaw motion.

The only critical part of the rotor system is the reliability of the rotor bearings. However, operation in a "zero force" environment should simplify the design. Since rotor speeds of 3600 r.p.m. or less are practical, conventional bearings could be used. Magnetic or air bearings also appear promising because the torques exerted by the rotor are only on the order of a couple of hundred dyne-cm. No matter what type of bearing is used, the power required to maintain the rotor speed should be extremely small. It is possible that the rotors from gyroscopic systems that have been designed for and already flight tested in the space environment could be used. Ground control of the rotor speed would permit the introduction of desirable spacecraft maneuvers.

I claim:

1. In a spacecraft, apparatus for yaw stabilization and libration damping of said spacecraft, comprising
   rotatable means in the spacecraft which will on rotation produce an angular momentum vector that will be oriented along the preferred pitch axis of the spacecraft,
   energy dissipative means provided between and joined to said rotatable means and the body of the spacecraft for providing libration damping of said spacecraft, and,
   means for rotating said first-mentioned means in order to produce yaw-controlling reaction torques on the spacecraft.

2. The spacecraft stabilization apparatus of claim 1, wherein said rotatable means comprise a rotor of circular dimensions, said rotor having a rim in which is concentrated a large proportion of the weight of said rotor.

3. The spacecraft stabilization apparatus of claim 1, wherein said energy dissipative means comprise spring means.

4. Apparatus for three-axis, gravity-gradient stabilization of a passively damped spacecraft comprising
   a housing fixedly attached to the spacecraft and having opposed walls,
   a rotor within the housing, the rotor having a rim in which is concentrated a large proportion of the weight of said rotor and further having a central hub,
   bearing means journaling said central hub for rotatably supporting said rotor, said bearing means being disposed in said opposed walls,
   energy dissipative means provided between and connected to said rotatable means for providing libration damping of the spacecraft, and
   a motor operatively connected to the rotor for rotating said rotor to produce yaw-controlling reaction torques on the spacecraft.